(12) United States Patent
Hirst et al.

(10) Patent No.: US 11,449,457 B2
(45) Date of Patent: Sep. 20, 2022

(54) COMMUNICATIONS BUS WITH ISOLATION CIRCUIT TO OPERATE ONE CIRCUIT DOMAIN WHILE ANOTHER IS DEACTIVE

(71) Applicant: Hewlett-Packard Development Company, L.P., Spring, TX (US)

(72) Inventors: Bartley Mark Hirst, Boise, ID (US); Cody Ravenscroft, Boise, ID (US); Charles Logan, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/298,556

(22) PCT Filed: Jul. 15, 2019

(86) PCT No.: PCT/US2019/041836
§ 371 (c)(1),
(2) Date: May 29, 2021

(87) PCT Pub. No.: WO2021/010969
PCT Pub. Date: Jan. 21, 2021

(65) Prior Publication Data
US 2022/0147481 A1    May 12, 2022

(51) Int. Cl.
*G06F 13/00*    (2006.01)
*G06F 13/42*    (2006.01)
*G06F 13/38*    (2006.01)
*G06F 13/40*    (2006.01)
*G06F 21/85*    (2013.01)

(52) U.S. Cl.
CPC ........ *G06F 13/4291* (2013.01); *G06F 13/385* (2013.01); *G06F 13/4068* (2013.01); *G06F 21/85* (2013.01)

(58) Field of Classification Search
CPC .... G06F 13/00; G06F 13/4291; G06F 13/385; G06F 13/4068; G06F 21/85
See application file for complete search history.

(56) References Cited

U.S. PATENT DOCUMENTS 7,010,639 B2    3/2006    Larson et al.
7,056,039 B2    6/2006    Mokuya et al.
7,310,697 B2    12/2007    Pandit et al.
(Continued)

FOREIGN PATENT DOCUMENTS

CN    102819447 A    12/2012

*Primary Examiner* — Henry Tsai
*Assistant Examiner* — Kim T Huynh
(74) *Attorney, Agent, or Firm* — Brooks Cameron & Huebsch PLLC

(57) ABSTRACT

Aspects are directed to systems in which control node communicates through a peripheral-side wired communications bus for data communications with other bus-coupled nodes. The control node acts as a master with a main-circuit domain during an initialization mode and when the main-circuit domain is deactivated, and acts as a slave, after completion of the initialization mode and when the main-circuit domain is not deactivated. An isolation circuit is used to isolate the main-circuit domain from the control node and, while the main-circuit domain is deactivated, to facilitate communications over the peripheral-side wired communications bus between the control node and another node connected to the peripheral-side wired communications bus.

15 Claims, 3 Drawing Sheets

(56) References Cited

U.S. PATENT DOCUMENTS

| | | | |
|---|---|---|---|
| 7,398,345 B2 | 7/2008 | Larson et al. | |
| 8,570,788 B2 | 10/2013 | Hess et al. | |
| 8,977,851 B2 | 3/2015 | Neitzel et al. | |
| 9,083,548 B2 | 7/2015 | Holmes et al. | |
| 2006/0174044 A1* | 8/2006 | Bomhoff | G06F 13/4286 |
| | | | 710/110 |
| 2008/0162770 A1 | 7/2008 | Titiano et al. | |
| 2011/0115308 A1* | 5/2011 | Wang | H02H 3/063 |
| | | | 307/125 |
| 2015/0100713 A1 | 4/2015 | Sengoku | |
| 2015/0234774 A1* | 8/2015 | Sengoku | G06F 13/4291 |
| | | | 710/106 |

\* cited by examiner

COMMUNICATIONS BUS WITH ISOLATION CIRCUIT TO OPERATE ONE CIRCUIT DOMAIN WHILE ANOTHER IS DEACTIVE

BACKGROUND

Aspects of the present disclosure are directed to data communications between circuit nodes over a communications bus.

More particularly, aspects of the present disclosure relate to controlled management of shared peripheral devices and products, and associated circuit nodes, over a data communications bus. By use of circuit nodes communicating over a data communications bus, different types of electronic circuits and systems are utilized to perform useful tasks, which are oftentimes specific to the peripherals. As examples, depending on the application such peripherals might include printers, data storage devices, interconnected electro-mechanical devices/motors, controllable parts in a farm implement, and interconnected circuits in a vehicle, such as an automobile or airplane.

In performing such tasks over the communications bus, important considerations may include reliability and speed of access to circuit nodes communicating over the data communications bus, increased bandwidth of the data conveyed over the communications bus, efficient and limited use of power by the system interconnecting the circuit nodes, and security for preventing unauthorized access to the circuit nodes.

BRIEF DESCRIPTION OF DRAWINGS

Various examples may be more completely understood in consideration of the following detailed description in connection with the accompanying drawings, in which.

Figure 1:
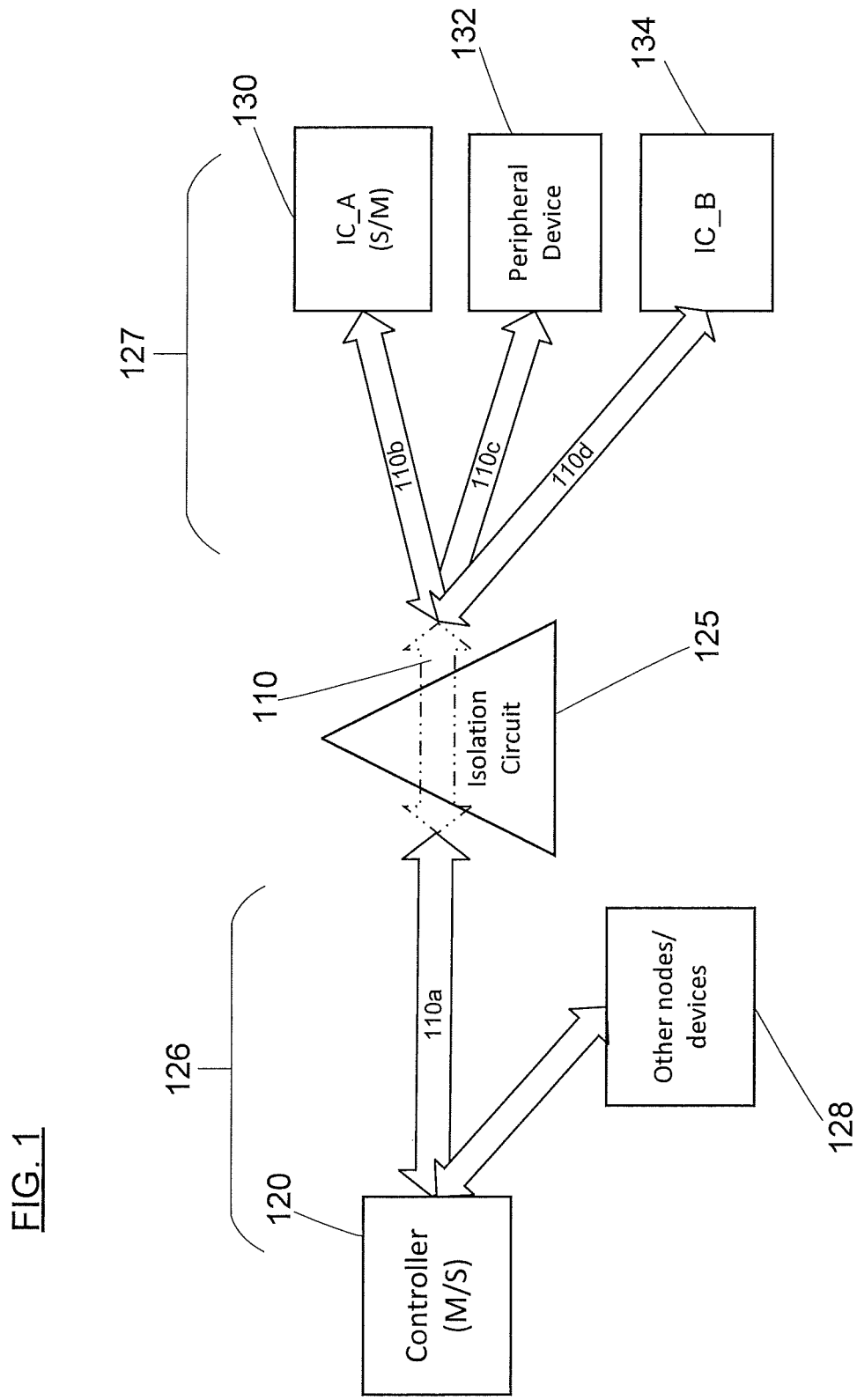
FIG. 1 is a system-level diagram illustrating an example of a system with aspects of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are applicable to a variety of different systems and methods including those examples described above in the background and including systems and devices using a communications bus including an isolation circuit between otherwise bus-communicative circuit nodes. Each of these nodes, including a central processing unit (CPU)/logic circuitry, may convey data over the communications bus as a slave and with one of the nodes being designated as the master. The isolation circuit is used to facilitate flexibility in which of the nodes is assigned as the master. As an example, one type of communications bus is a two-wire bus (e.g., inter-integrated circuit bus or "I$^2$C" bus), which may be used to provide a communications link between integrated circuits (IC) nodes. Such a two-wire bus may consist of two active wires referred to as the serial data line (SDA) to convey information and serial clock line (SCL) to convey timing such as used for synchronization between circuit nodes. Certain aspects of the present disclosure relate to such systems carrying out tasks by certain of the circuit nodes while other circuit nodes are powered down or otherwise blocked from accessing the communications bus by the isolation circuit. If the communications bus is to be a conduit for communicating with these circuit nodes, issues arise as to how these circuit nodes are to be brought back into activation for accessing the communications bus and performing the necessary tasks and which node is to be in control of the data communications conveyed over the bus. In systems using a two-wire bus or another minimal-wire communications bus having one line used for synchronization and another line used for conveying data, this issue can be further complicated. Other examples of a minimal-wire communications bus include serial peripheral interface (SPI) and controller area network (CAN), which may use the above-noted two types of wires (for data and synchronization) and may also use a third line (or wire)

As another more specific example of how the above issues may be addressed, the communications bus may normally provide system access to multiple nodes (or devices) associated with or part of the system and, in some instances, one or some of the nodes may be inactive such as not needing to be in a full power mode when the system is seeking to render the communications bus inaccessible for a period of time, or when in use only for certain authorized users. For example, in certain instances, this isolation permits peripheral devices to communicate with one another such as for security purposes, before permitting access and/or activation of devices on the other side of the isolation circuit, such as a printer which communicates on another I$^2$C communications bus.

Turning now to the figures, each of which is consistent with exemplary aspects of the present disclosure, FIG. 1 illustrates a system including a communications bus arrangement 110 to facilitate communications involving a controller 120 (e.g., a circuit node including a CPU), and involving an isolation circuit 125, which is used to communicatively isolate a first circuit domain 126 from a second circuit domain 127. The first circuit domain 126 is shown on the left of the isolation circuit 125 including the controller 120 and other bus-coupled devices 128, while the second circuit domain 127 is shown on the right of the isolation circuit 125. As exemplified in FIG. 1, the second circuit domain 127 includes bus-coupled circuit nodes identified as an integrated circuit (IC) 130, and circuitry within and forming part of a peripheral device 132. The peripheral device 132 could be any of a variety of peripheral apparatuses including, as examples, a printer, a photocopier, a temperature-control system in a vehicle, etc. Optionally, additional bus-coupled circuits, such as IC 134, might be included in the second circuit domain 127.

The communications bus arrangement 110 may be viewed as a single integral communications bus having different bus sections 110a, 110b, 110c, etc. Using multiple ones of these sections, the isolation circuit 125 facilitates communications either: between the controller 120 in the first circuit domain 126 and one of the nodes in the second circuit domain 127;

or among the nodes in the second circuit domain 127. In certain examples: each of the different bus sections may be a two-wire bus such as an I²C bus; at least one but not all of the different bus sections may be an I²C bus two-wire bus; and among the different bus sections, there may be included one or more two-wire buses and one or more three-wire buses. In other examples, the integral communications bus is a one-wire communications bus which serially addresses three one-wire circuit nodes (e.g., switches). One serially-addressable node can be used to create a chip selected (e.g., active-low with the biasing pull-up resistors), the second node may be used to provide the serial-data line, and the third node (facilitated by logic circuitry such as exclusive-OR gates) may be used to provide the serial clock. In such examples, there may be a return line for ground.

The isolation circuit 125 may be used differently to facilitate such communications in the context of master-slave data communications. For instance, the isolation circuit 125 may be used to permit a communications mode in which one circuit node is to act as the master with control over data communications over the communications bus arrangement 110, thereby forcing the other circuit node(s) to communicate on the communications bus only on command or via permission provided by the node which is acting as a master. The isolation circuit 125 is included as part of the communications bus arrangement 110 to provide and switch on and off a pathway for communications between the first and second circuit domains 126, 127. For example, while the first circuit domain 126 is deactivated (e.g., in a low-power mode or powered off), switch circuitry within the isolation circuit 125 may be switched open (disabling the pathway) to facilitate communications between nodes within the second circuit domain 127.

In certain examples, the controller 120 (or other nodes) in the first circuit domain 126 are operated in a low-power mode so long as serving the role of a slave and while the isolation circuit 125 blocks the pathway along the communications bus arrangement 110, suspending communications between the first and second circuit domains 126, 127. This mode may continue indefinitely, until the node acting as the master (or another source) causes this mode to change. In this context, the controller 120 may be powered off and another bus-coupled node such as IC 130 may act as respective heartbeat-on circuit for monitoring (e.g., and communicating periodically with IC 134) and thereby facilitating eventual communications from the second circuit domain 127. The IC 134 may also maintain security features, such as authorization validation for access, and may also act to sense events to indicate that the system should be brought to full power. Once such communications are received, the controller 120 is caused (or commanded over the communications bus) to power up to a normal/full-power mode.

In this context, heartbeat-on refers to a circuit condition corresponding to the circuit being sufficiently alive to respond for further activity (e.g., from which further activity may occur by an interrupt, an external signal, or a timed mechanism) in order to perform at least some minimal functions (e.g., house-keeping functions). These functions may include operations ranging from a simple chore, such as incrementing the value of a timer, to a more complex chore, such as updating a list of items to be checked on periodically.

Depending on the application, this isolation/switching aspect may be advantageous to permit circuit nodes, such as IC 130 and 134, to communicate with one another under control of the IC 130 without interference or involvement of the first circuit domain 126, and/or to permit circuitry in the second circuit domain 127 to authorize or validate certain activities before activating circuitry in the first circuit domain 126. Such authorization or validation might include as examples: security procedures; user authentication; and background communications or alerts to other circuits at remote locations in order to notify personnel/equipment of certain activity occurring at and involving the second circuit domain 127.

The isolation circuit 125 may also be used to in connection with facilitating change for this master-slave relationship, thereby assisting with the IC 130 switching its role from the master node to a slave node, thereby permitting another of the circuit nodes to act as the master node. In accordance with aspects of the instant disclosure, this change of the master-slave relationship may occur in connection with the above-characterized initialization mode involving the second circuit domain 127 and in instances involving activities relating to both first and second circuit domains 126, 127.

As an example of activities relating to both first and second circuit domains 126, 127, the initialization may involve a process to initialize the controller 120 by way of the IC 130. This might occur, for instance, to authorize a certain user via a biosensor employing the IC 130. During such initialization, the controller 120 and other circuitry within the first circuit domain 126 may be inactive and circuitry in the second circuit domain 127 may provide signaling for clocked synchronous master-slave communications on the communications bus 110a, thereby facilitating synchronous communications involving other nodes.

During such initialization, the IC 130 acts as a master in its communication with the first circuit domain 126, while all other active bus-coupled circuits act as slaves. After completion of the initialization mode, the roles of master and slave(s) may change for the IC 130 and the controller 120. The IC 130 surrenders its role as master and, then concurrently over a short period of time (within several sync-clock cycles), the controller 120 is activated to become master and switch circuitry (not shown in FIG. 1 and which is within the isolation circuit 125) and closes the pathway between the first and second circuit domains 126, 127, and the controller 120 has master-level control over the communications bus arrangement 110 including sections 110a, 110b, etc. in both domains.

Figure 2:
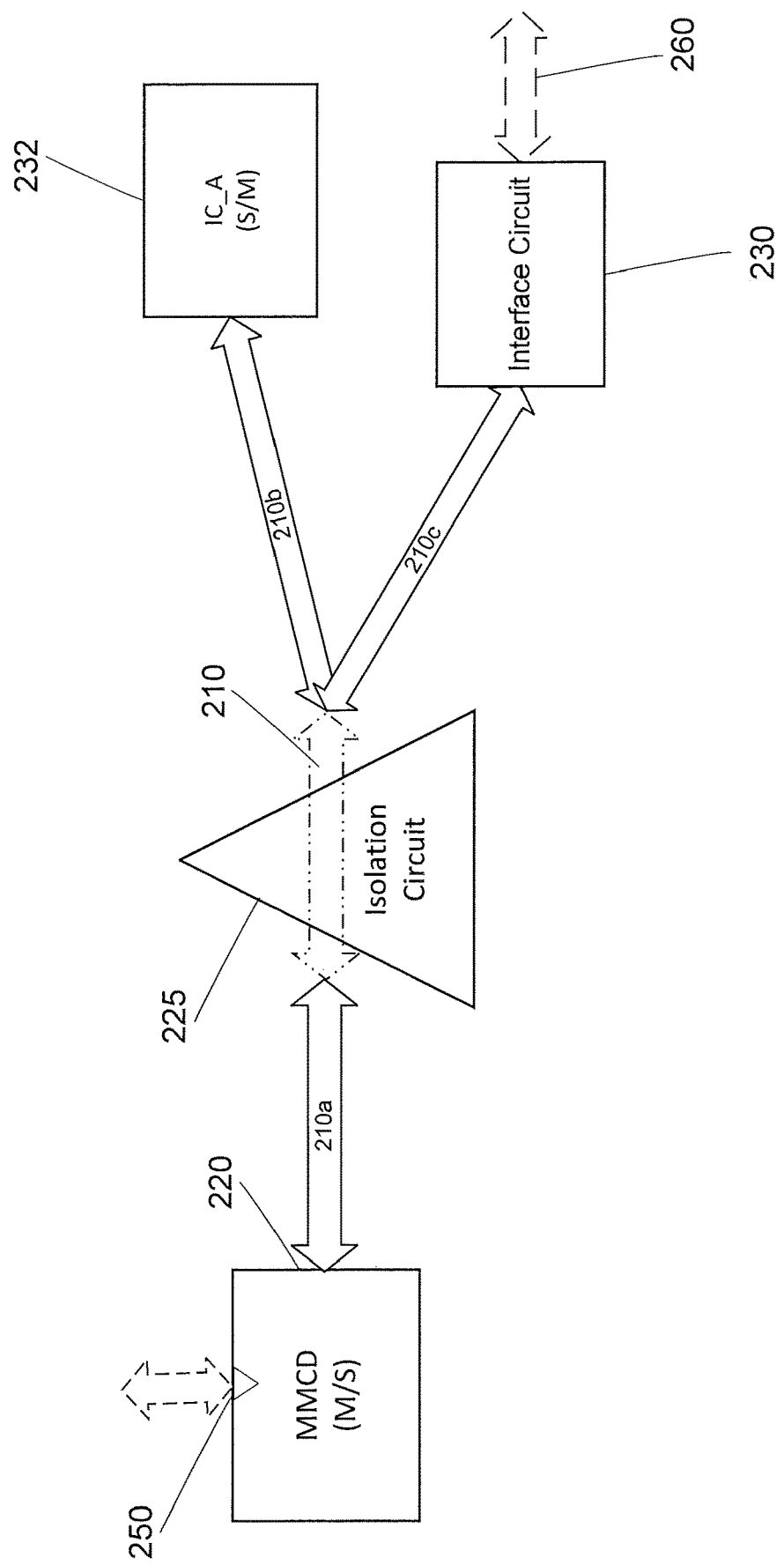
FIG. 2 is also a system-level diagram illustrating another example of a system with aspects of the present disclosure.

FIG. 2 depicts a slightly different system-level diagram illustrating another example system, in accordance with the present disclosure, having a plurality of circuits on either side of and communicatively separable by an isolation switch 225. In both FIGS. 1 and 2, like reference numerals are used to show circuitry having related operations; as examples, controller 120 and another circuit-based device 220 operate similarly in the contexts described above in connection with FIG. 1, and the same is true for isolation circuits 125 and 225. Similarly, nodes 132 and 232 correspond, and the sections 110a, 110b, etc. (of the communications bus arrangement 110) correspond to sections 210a, 210b, etc. in FIG. 2.

Differences between the systems shown in FIGS. 1 and 2 include application-specific aspects associated with the depicted circuit nodes. In FIG. 1, the controller 120 is intended to depict a control circuit which might be part of any of a number of devices or products (e.g., a printer, photocopier, etc.), whereas the circuit-based device 220 of FIG. 2 is depicted as a management module control device (MMCD) 220 configured to manage specific devices or tasks as directed from another source (not shown) via communications port 250. Also, in FIG. 1, the IC 130 has been described as changing roles between master and slave, whereas the related circuit in FIG. 2 is depicted as an interface circuit 230 configured to provide an interface to other higher-functioning circuit-based device which communicate with the interface circuit 230 on an entirely different type of communications bus 260. For example, the communications bus 260 may be more complex in that it accommodates a protocol wherein: both address-type information and data-type information are conveyed on separate mediums (e.g., a different and dedicated bus wire for each); address-type information is conveyed in parallel over a plurality of wires or wirelessly; or in another manner that includes more than a minimal number of bus wires (that is 2 or 3) for conveying both address- and data-type information.

Figure 3:
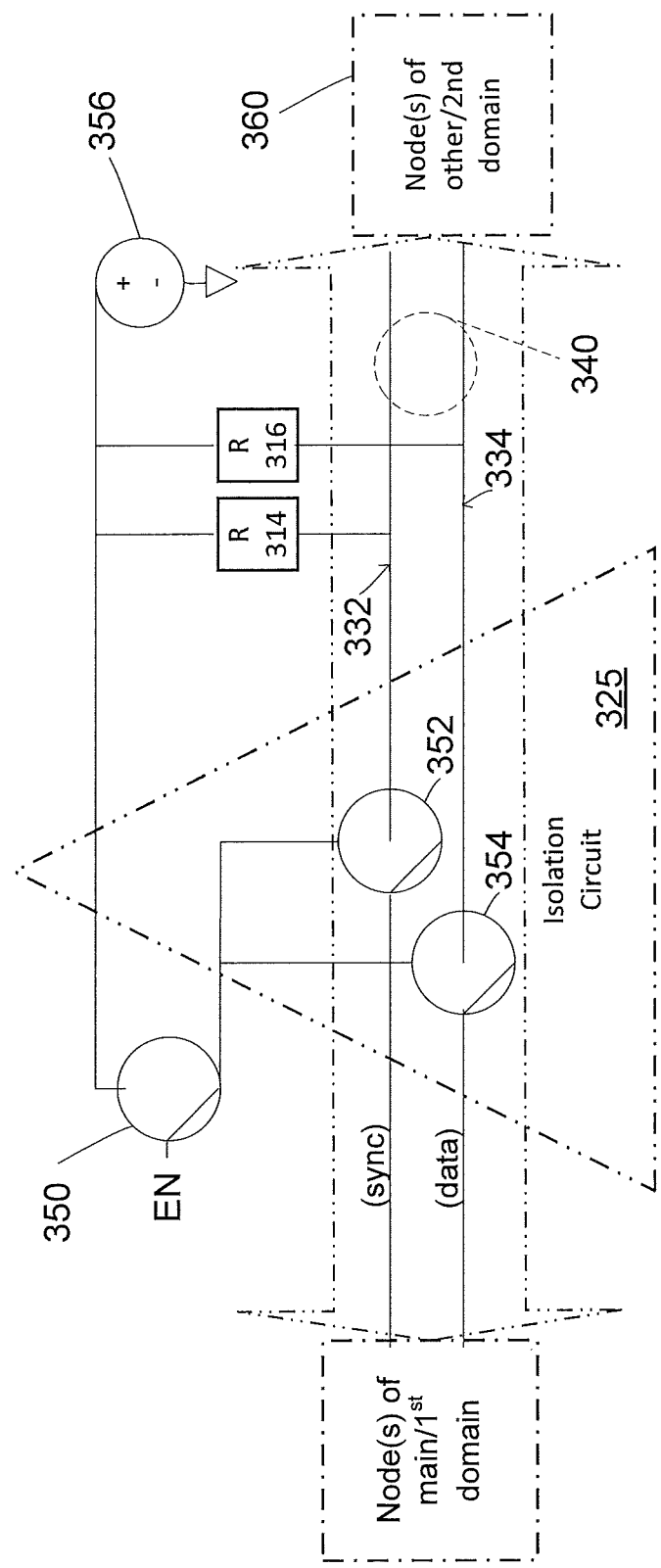
FIG. 3 is concept-level diagram showing an example of how circuitry, as exemplified in one of the above-noted systems, might be implemented consistent with aspects of the present disclosure.

FIG. 3 depicts a concept-level diagram showing an example of how impedance-based circuitry, such as resistors 314 and 316, may be used to exemplify a two-wire (VC) communications bus consistent with the above description of the above-noted systems shown and discussed with FIGS. 1 and 2. In FIG. 3, an isolation circuit 325 (similar to 125 and 225 of FIGS. 1 and 2) is shown with switches along each of two wires 332 and 334 along a two-wire communications bus 340. The two wires 332 and 334, representing a line used for synchronization ("sync") signals and another line used for data, are selectively passed through the isolation circuit 325 by switches 350, 352 and 354. The resistors 314 and 316 are arranged as pull-up resistors to permit any of the circuit nodes to signal the communications bus by forcing the wires 332 and 334 to a logic-zero state (the voltage close to zero volts or common) and by releasing this state to let the resistors return (by the bias from the voltage on the other side of the resistors) to voltage level on the wires 332 and 334 to the logic-one state. This impedance-based bias provided to the wires 332 and 334 is one example of a "wired-Or" Boolean logic connection and in this instance, using only passive components (as opposed to active components such as field effect transistors (FETs)).

Each of the switches 350, 352 and 354 may be implemented in a variety of different forms including each, for example, as an analog electric circuit such as a FET with the gate controlled either to pass or to block a signal between source and drain. As depicted, the switch 350 is controlled by an enable signal, which is activated to cause switch 350 to pass a fixed voltage from a voltage source 356, and which in turn, causes both switches 352 and 354 to pass their respective sync and data signals. This action, in turn, is used to render the communications bus arrangement (e.g., 110) whole again for communications between nodes on either side of the isolation circuit 325.

At the switch 350, the enable signal (activated to close the switch 350) may be provided by different approaches (and corresponding circuits which are not shown). One approach uses a timer, or alternatively a comparator circuit which is activated when a power supply in one of the circuit nodes reaches a certain level, to generate the enable signal for control of the switch 350. Another approach uses a separate line (which is not part of the depicted communications bus) coupled with the master circuit node 360 on the right side of the isolation circuit 325. While still acting as master, the circuit node 360 generates the enable signal as part of the transition process to surrender the role as the master.

As examples, the Specification describes and/or illustrates aspects useful for implementing the claimed disclosure by way of various structure, such as circuits or circuitry, selected or designed to carry out specific acts or functions, as may be recognized in the figures or the related discussion as depicted by or using terms such as the ICs, blocks, modules, and the like described above in connection with FIGS. 1, 2 and 3. It will also be appreciated that certain of these blocks may also be used in combination to exemplify how operational aspects (e.g., steps, functions, activities, etc.) have been designed, arranged and whether used alone and/or in combination with other such blocks (or circuitry and circuit elements such as transistors, resistors etc.). Depending on the data-processing application, such instructions (and/or configuration data) can be configured for implementation in logic circuitry, with the instructions (via fixed circuitry, limited group of configuration code, or instructions characterized by way of object code, firmware and/or software) as may be stored in and accessible from a memory (circuit). Also, where the Specification makes reference to adjectives for certain circuit structure, such as "first" (versus "second") or "main" versus "peripheral", the adjective is not used to connote any description of the structure or to provide any substantive meaning but is rather used to differentiate one such similarly-named structure from another.

What is claimed is:

1. An apparatus comprising:
   a wired communications bus comprising different bus sections including a peripheral-side wired communications bus and a main-side wired communications bus, wherein the different bus sections comprise at least one two-wire bus section and at least one three-wire bus section;
   a control node to communicate through the peripheral-side wired communications bus:
     as a master, with a main-circuit domain during an initialization mode and when the main-circuit domain is deactivated; and
     as a slave, after completion of the initialization mode and when the main-circuit domain is not deactivated, with the main-circuit domain;
   an isolation circuit to isolate the main-circuit domain from the control node and, while the main-circuit domain is deactivated, to facilitate communications over the peripheral-side wired communications bus between the control node and another node connected to the peripheral-side wired communications bus; and
   a pull-up resistor coupled to each wire of the at least two-wire bus section passing through the isolation circuit such that a circuit node signals the wired communications bus via wires in the at least one two-wire bus section when in a logic-zero state.

2. The apparatus of claim 1, further including the main-circuit domain, and wherein the main-circuit domain includes the main-side wired communications bus to connect to the isolation circuit and includes an electronically-controlled product to communicate on the main-side wired communications bus.

3. The apparatus of claim 1, wherein the main-circuit domain being deactivated corresponds to a mode in which the main circuit domain is at least partially powered down.

4. The apparatus of claim 1, further including the main-circuit domain, and wherein the main-circuit domain includes the main-side wired communications bus for communications through the isolation circuit with the peripheral-side wired communications bus.

5. The apparatus of claim 1, wherein the two-wire bus section includes one line used to convey data and another line used to convey synchronization information.

6. The apparatus of claim 1, further including the main-circuit domain, and wherein the main-circuit domain includes the main-side wired communications bus for communications through the isolation circuit with the peripheral-side wired communications bus, and wherein the wired communications bus includes a bias circuit through an impedance path to provide a voltage bias level.

7. The apparatus of claim 1, wherein the peripheral-side wired communications bus includes a bias circuit to provide a voltage bias level, through an impedance path, to a line of the peripheral-side wired communications bus.

8. The apparatus of claim 1, further including the other node connected to the peripheral-side wired communications bus, the other node to act as a heartbeat-on circuit for facilitating communications over the peripheral-side wired communications bus including communications to cause the main-circuit domain to power up.

9. The apparatus of claim 1, further including the other node connected to the peripheral-side wired communications bus, and wherein the control node and the other node are to act as a heartbeat-on circuit for facilitating communications over the peripheral-side wired communications bus to secure authorized access to the apparatus before the main-circuit domain is powered up.

10. An apparatus comprising:
a wired communications bus comprising different bus sections including a peripheral-side wired communications bus and a main-side wired communications bus, wherein the different bus sections comprise at least one two-wire bus section and at least one three-wire bus section;
the peripheral-side wired communications bus to communicate with a main-circuit domain via clocked synchronous master-slave communication using wired communication;
a slave node including an I/O (input/output) port to be accessed through the peripheral-side wired communications bus;
a control node to communicate, through the wired communications bus:
as a master with the main-circuit domain during an initialization mode; and
as a slave, after completion of the initialization mode, with the I/O port of the peripheral-side slave node and with the main-circuit domain;
an isolation circuit to isolate the main-circuit domain from the wired communications bus and, while the main-circuit domain is powered down, to facilitate communications over the wired communications bus between the control node and the slave node; and
a pull-up resistor coupled to each wire of the at least two-wire bus section passing through the isolation circuit such that a circuit node signals the wired communications bus via wires in the at least one two-wire bus section when in a logic-zero state.

11. The apparatus of claim 10, further including the main-circuit domain, and wherein the control node and the slave node are to act as a heartbeat-on circuit for facilitating communications over the peripheral-side wired communications bus to secure authorized access to the apparatus before the main-circuit domain is powered up.

12. The apparatus of claim 10, further including the main-circuit domain, and wherein the main-circuit domain includes the main-side wired communications bus to connect to the isolation circuit and includes an electronically controlled printer to communicate on the main-side wired communications bus and to receive commands from the control node.

13. The apparatus of claim 10, wherein at least one section of the wired communications bus is a bi-directional two-wire serial I²C bus.

14. A method comprising:
isolating, via an isolation circuit, a main-circuit domain from a control node and a slave node;
facilitating communications over a wired communications bus between the control node and the slave node while the main-circuit domain is powered down, wherein the wired communication bus comprises different bus sections including a peripheral-side wired communications bus and a main-side wired communications bus, the different bus sections comprising at least one two-wire bus section and at least one three-wire bus section;
communicating between the control node and the main-circuit domain through the wired communications bus and through the isolation circuit, wherein the control node communicates:
as a master with the main-circuit domain during an initialization mode and when the main-circuit domain is deactivated; and
as a slave, after completion of the initialization mode and when the main-circuit domain is activated, with the main-circuit domain; and
signaling the wired communications bus via wires in the at least one two-wire bus section when a pull-up resistor coupled to each wire of the at least two-wire bus section passing through the isolation circuit are in a logic-zero state.

15. The method of claim 14, wherein the wired communication is provided by wiring, with no more than three wires, to convey data and synchronization information.

* * * * *